United States Patent
Pearce

(10) Patent No.: US 9,327,596 B2
(45) Date of Patent: May 3, 2016

(54) FUEL TANK WAVE CATCHER

(71) Applicant: Ford Global Technologies, LLC, Dearborn, MI (US)

(72) Inventor: Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 13/741,064

(22) Filed: Jan. 14, 2013

(65) Prior Publication Data

US 2014/0197176 A1 Jul. 17, 2014

(51) Int. Cl.
*B65D 88/12* (2006.01)
*B60K 15/077* (2006.01)

(52) U.S. Cl.
CPC ....... *B60K 15/077* (2013.01); *B60K 2015/0775* (2013.01); *B60K 2015/0777* (2013.01); *Y10S 903/902* (2013.01)

(58) Field of Classification Search
CPC .... B60K 15/077; B60K 15/03; B60K 15/073; B60K 2015/0775; B60K 2015/03467; B60K 2015/0344; B60K 2015/03236; B63B 11/04; B60P 3/2235; B60P 3/224; B60P 3/24; B65D 90/52; B47C 47/0035; B47C 47/0019; B64D 37/08; B61D 5/00
USPC .................. 220/563, 530, 529, 564; 261/123; 137/374; 903/902
See application file for complete search history.

(56) References Cited

U.S. PATENT DOCUMENTS

| | | | | | |
|---|---|---|---|---|---|
| 1,521,255 | A | * | 12/1924 | Scheu | 220/553 |
| 2,428,056 | A | * | 9/1947 | Wachsman | 220/719 |
| 2,675,682 | A | * | 4/1954 | Dobson | 220/563 |
| 2,840,259 | A | * | 6/1958 | Steidl | 220/563 |
| 3,294,278 | A | * | 12/1966 | Madden et al. | 220/563 |
| 3,347,406 | A | * | 10/1967 | Katzenmeyer | 220/530 |
| 3,917,109 | A | * | 11/1975 | MacDonald | 220/746 |
| 4,499,040 | A | * | 2/1985 | Maemoto et al. | 264/167 |
| 4,844,278 | A | | 7/1989 | Friewald et al. | |
| 5,005,716 | A | * | 4/1991 | Eberle | 215/373 |
| 5,860,565 | A | * | 1/1999 | Winston et al. | 222/1 |
| 5,975,331 | A | * | 11/1999 | Ishikawa | 220/564 |
| 6,408,874 | B1 | * | 6/2002 | Keller | 137/574 |
| 6,408,979 | B1 | | 6/2002 | Forbes et al. | |
| 6,786,350 | B2 | | 9/2004 | Bauer | |
| 7,445,082 | B2 | | 11/2008 | Nakanii et al. | |
| 8,212,666 | B2 | * | 7/2012 | Meurle | 340/468 |
| 8,342,358 | B2 | * | 1/2013 | Kobayashi et al. | 220/563 |
| 2008/0035649 | A1 | * | 2/2008 | Ohlsson et al. | 220/564 |
| 2009/0266442 | A1 | * | 10/2009 | Duscher et al. | 141/95 |
| 2011/0139793 | A1 | * | 6/2011 | Park | 220/563 |
| 2013/0001231 | A1 | * | 1/2013 | Noskov | 220/564 |

OTHER PUBLICATIONS

Koli, G.C. et al., "Simulation of Fluid Sloshing in a Tank," Proceedings of the World Congress on Engineering 2010 vol. II, WCE 2010, Jun. 30-Jul. 2, 2010, London, UK, 6 pages.
Li, Fan et al., "Radiated Fuel Tank Slosh Simulation," SAE 2011 World Congress and Exhibition, SAE Technical Paper 2011-01-0495, 2011, 8 pages.

* cited by examiner

*Primary Examiner* — Anthony Stashick
*Assistant Examiner* — James M Van Buskirk
(74) *Attorney, Agent, or Firm* — James Dottavio; Alleman Hall McCoy Russell & Tuttle LLP

(57) ABSTRACT

A fuel tank for a hybrid vehicle is disclosed. In one example approach, a fuel tank for a vehicle comprises a wave catcher extending through an interior of the fuel tank and coupled to a front wall and a first side wall of the fuel tank.

19 Claims, 5 Drawing Sheets

FUEL TANK WAVE CATCHER

BACKGROUND AND SUMMARY

Hybrid electric vehicles may utilize engines, e.g., gasoline engines, to propel the vehicle during some conditions and may use electric motors to propel the vehicle during other conditions. For example, a hybrid vehicle may use the electric motor during low engine load and speed conditions. During accelerations/decelerations, such as during an increase in forward motion of the vehicle or during a braking event of the vehicle, when the engine of the hybrid vehicle is not in operation, an amount of noise produced by operating components of the vehicle may be low, e.g., less than a threshold noise level. During these conditions, fuel stored in a fuel tank onboard the vehicle may slosh around within the fuel tank and may hit corners or walls of the fuel tank creating a slapping or sloshing noise that may be audible inside the vehicle when the engine is not in operation.

Further, in some examples, in order to reduce packaging space, a fuel tank in a hybrid vehicle may have a shelf design, where a depth of the fuel tank is decreased at an end of the fuel tank, e.g., at a back end of the fuel tank. For example, such a shelf tank design may assist in packaging the fuel tank adjacent to a wheel axle of the vehicle or adjacent to other components of the vehicle. In this example, during accelerations, e.g., deceleration due to braking, at low vehicle speeds, e.g., 2 mph, when the engine is not in operation, waves of liquid fuel may combine and create a large energy force hitting one of the front corners of the fuel tank. This wave may create a slap noise or sloshing sound that is audible to a vehicle operator from inside of the vehicle.

The inventors herein have recognized the above-mentioned disadvantages and, as one example approach, have developed a fuel tank for a vehicle, comprising: a wave catcher extending through an interior of the fuel tank and coupled to a front wall and a first side wall of the fuel tank. For example, the wave catcher may be located opposite a shelf-end of the tank.

In this way, the wave catcher may direct waves of liquid fuel in the fuel tank away from one of the corners of the fuel tank, thus reducing noises associated with movement of liquid fuel in the fuel tank. For example, during an acceleration or deceleration condition, such as during a braking event, the wave catcher may redirect and disperse the waves of liquid fuel to reduce the energy of the waves and reduce sloshing or other noises associated with movement of liquid fuel in the tank. Further, reducing noise associated with movement of fuel in the tank may increase a vehicle operator's satisfaction in operating the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5 are drawn approximately to scale, although other relative dimensions may be used, if desired.

DETAILED DESCRIPTION

Figure 1:
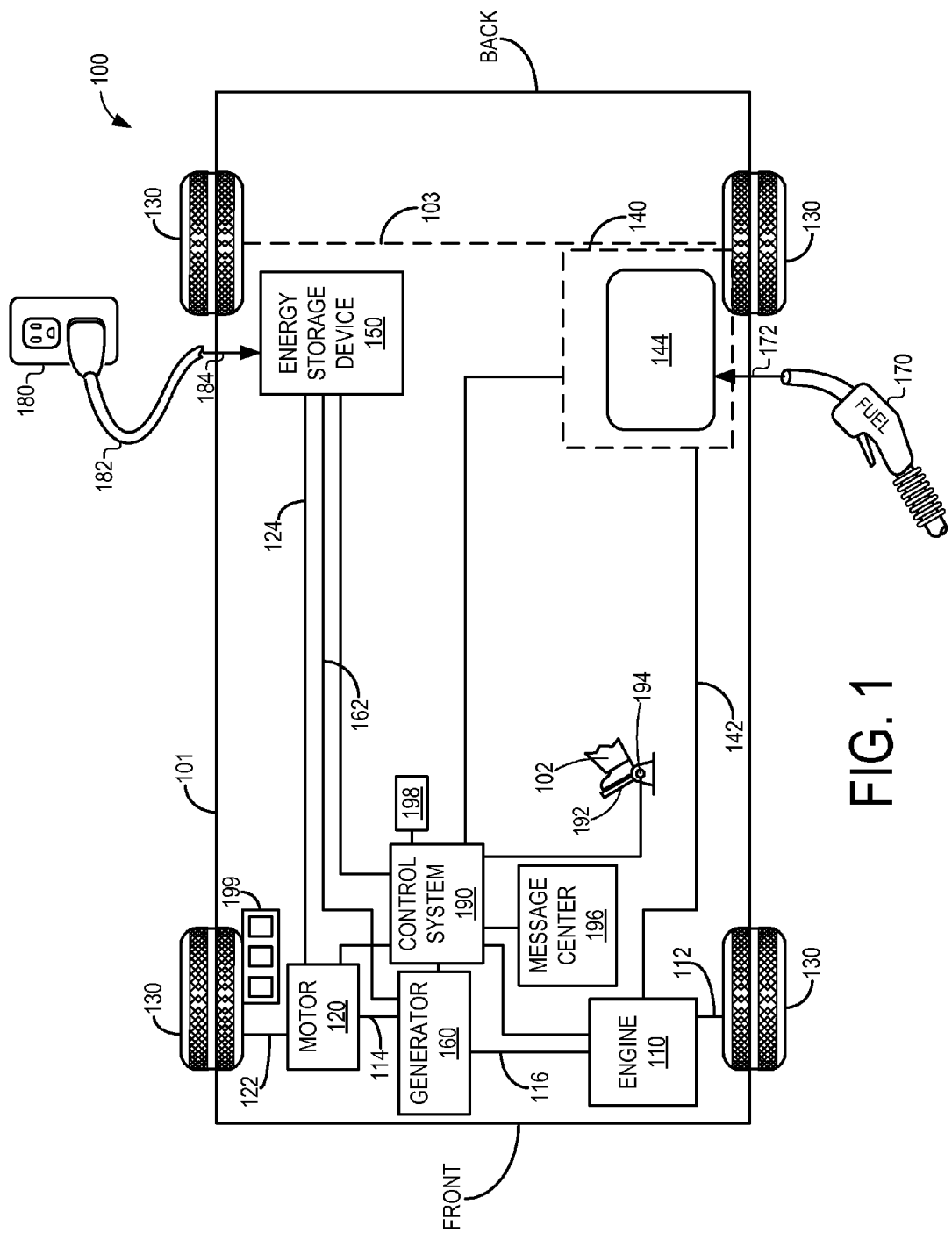
FIG. 1 shows a top view of an example vehicle in accordance with the disclosure.
Figure 2:
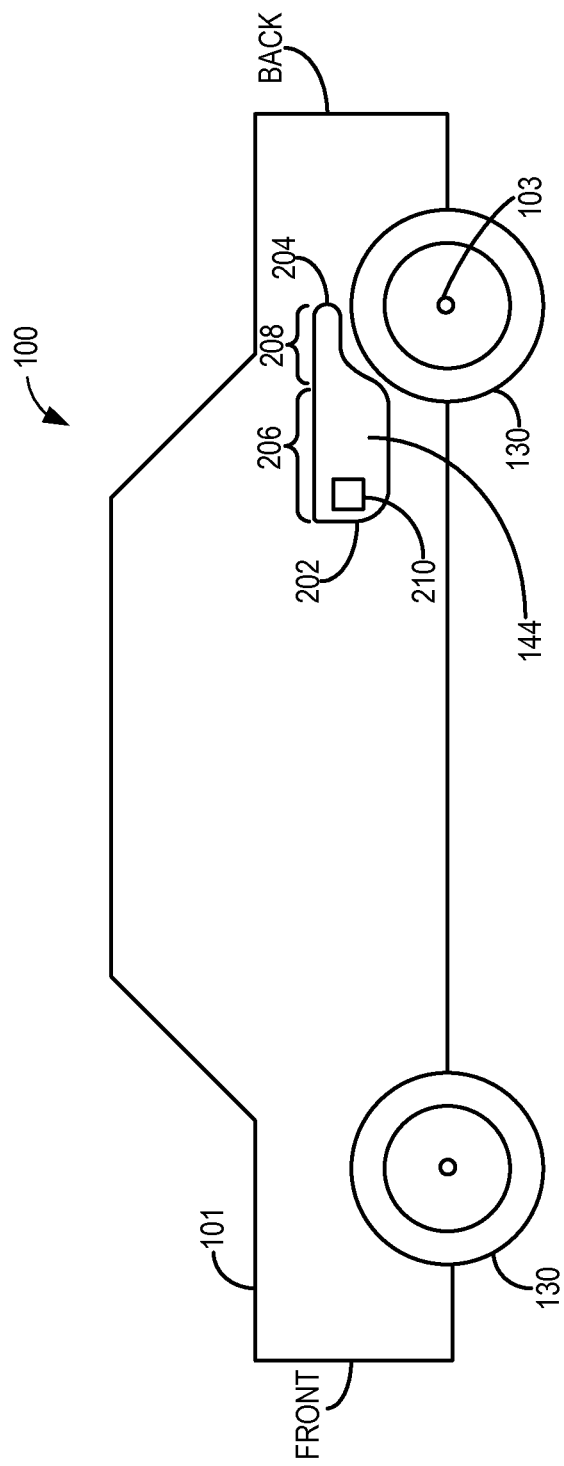
FIG. 2 shows a side view of an example vehicle in accordance with the disclosure.
Figure 3:
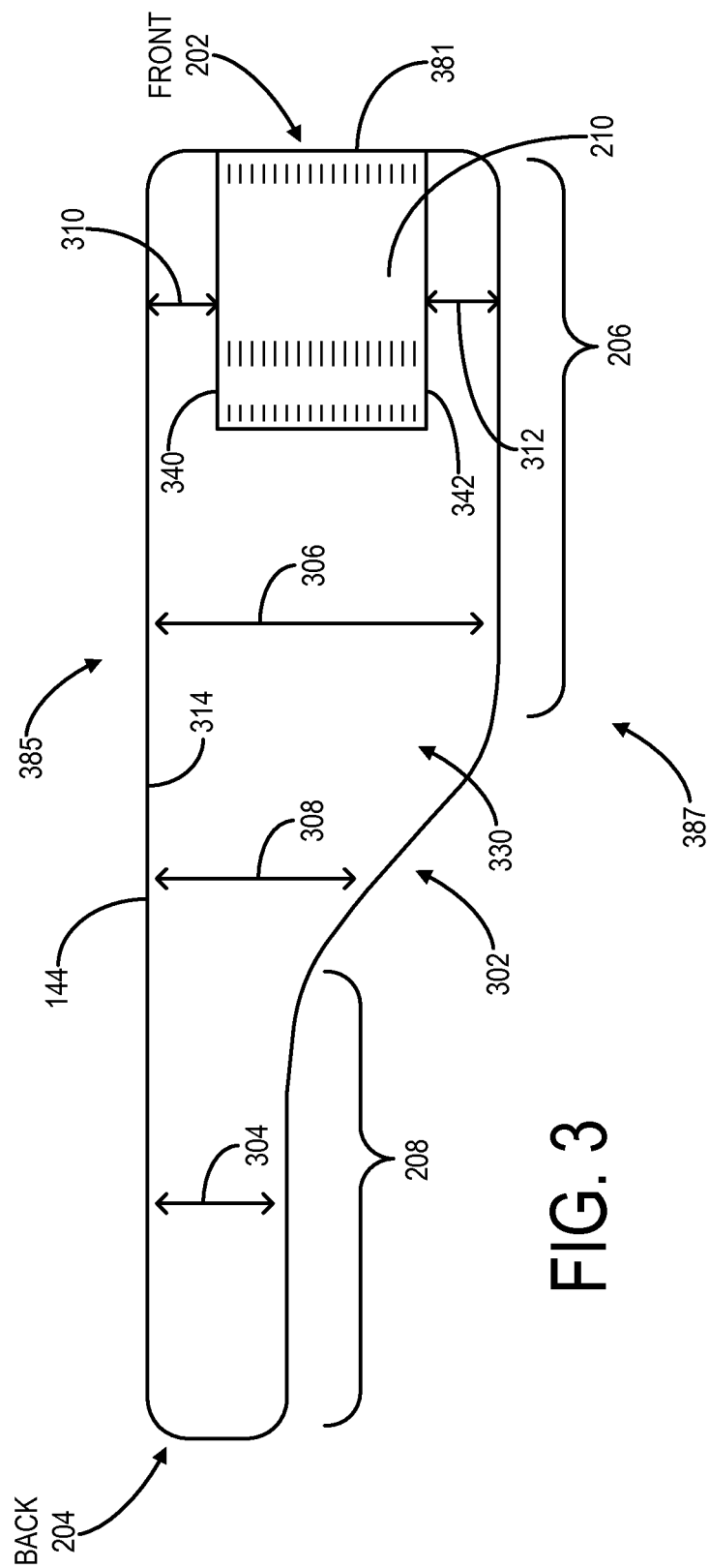
FIGS. 3, 4, and 5 show different viewpoints of an example fuel tank in accordance with the disclosure.
Figure 4:
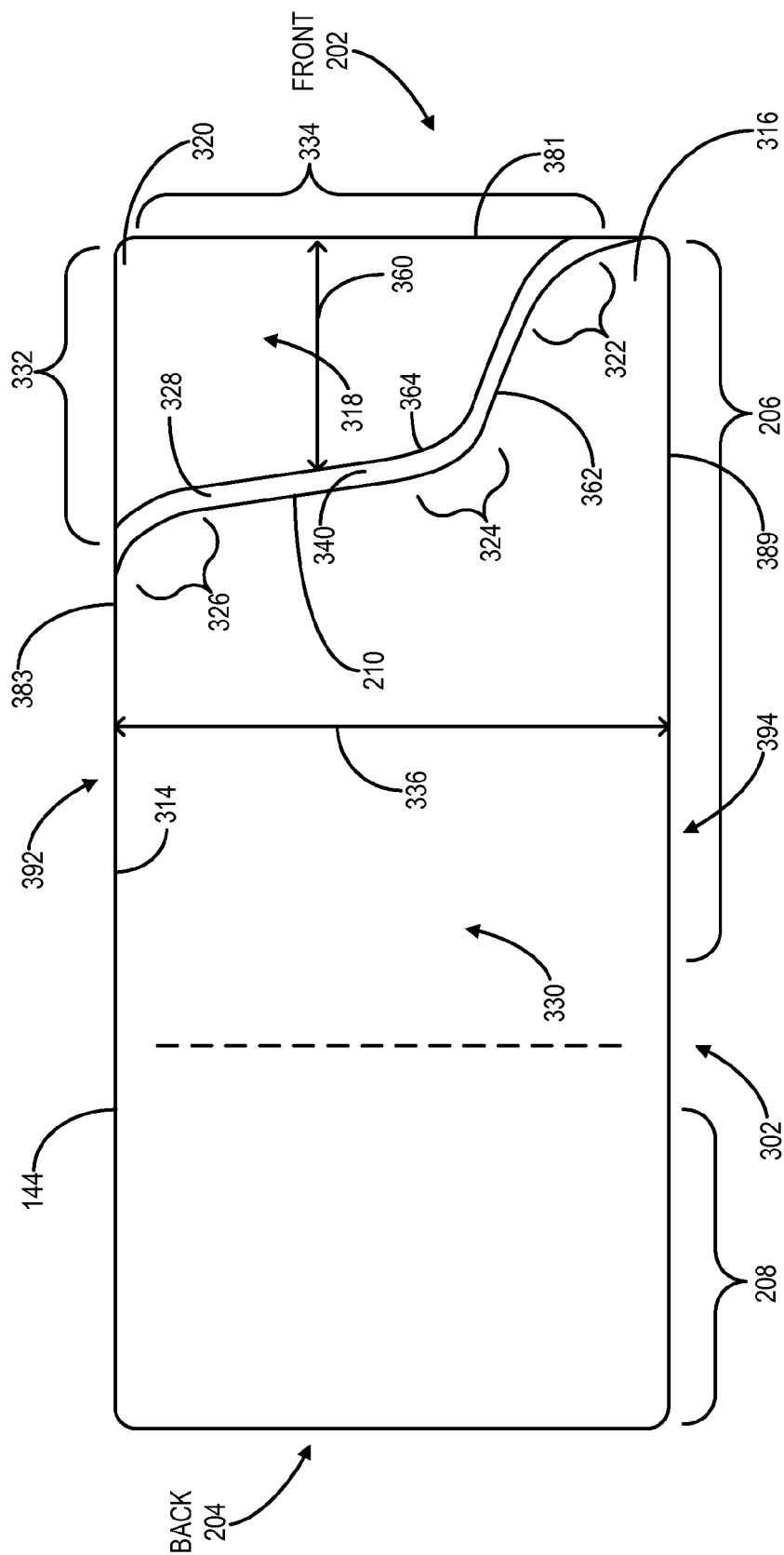
Figure 5:
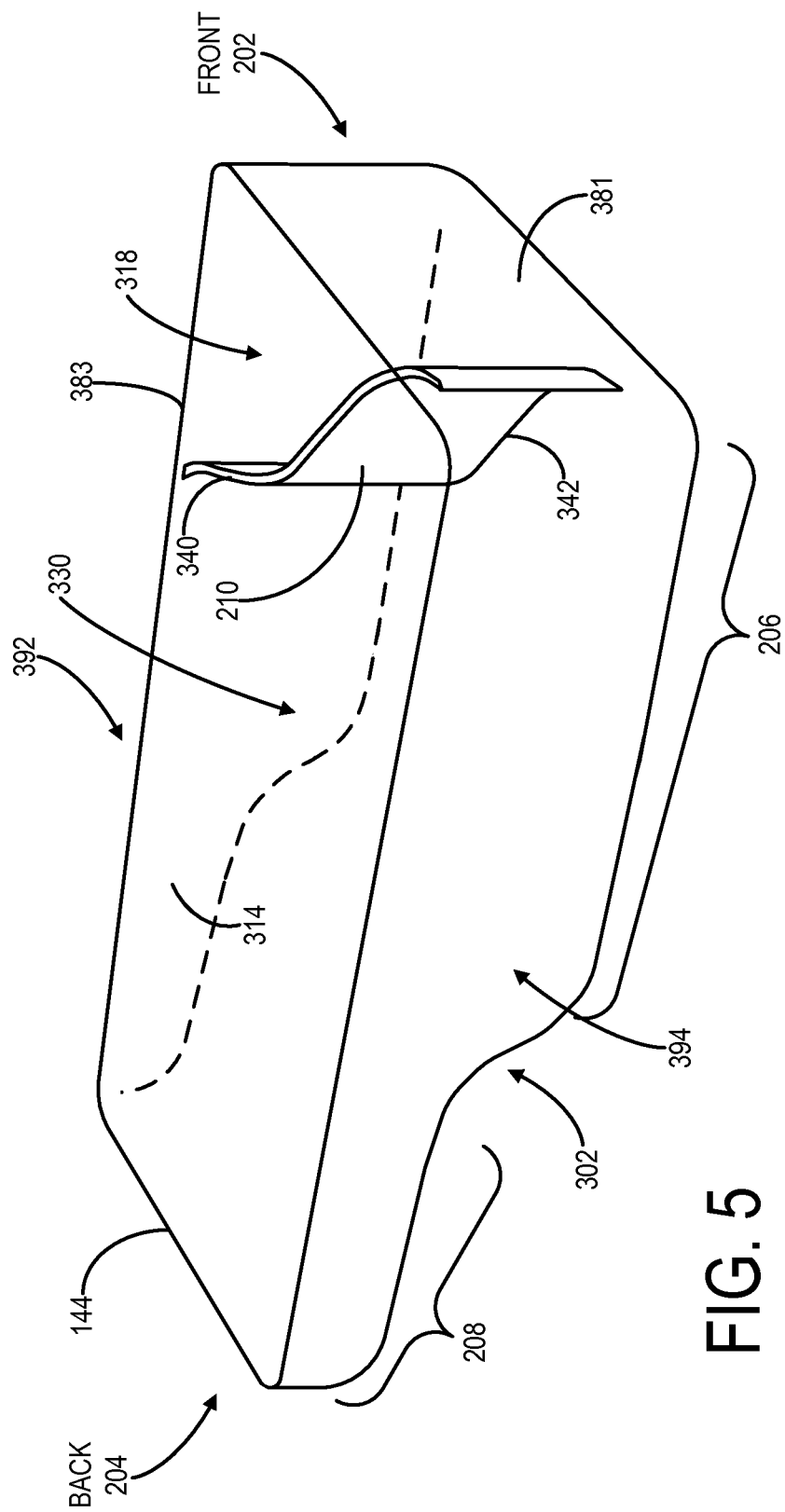

The following description relates a fuel system in a vehicle, e.g., the hybrid electric vehicle shown in FIGS. 1 and 2. In order to reduce noises associated with liquid fuel movement in a fuel tank in a fuel system, a wave catcher or other such devices as described herein may be included in the fuel tank as shown in FIGS. 3-5. The wave catcher may direct waves of liquid fuel in the fuel tank away from the corners of the fuel tank, thus reducing noises associated with movement of liquid fuel in the fuel tank. For example, during an acceleration or deceleration condition in a hybrid vehicle, such as during a braking event, the wave catcher may redirect and disperse the waves of liquid fuel to reduce the energy of the waves and reduce sloshing or other noises associated with movement of liquid fuel in the tank.

FIG. 1 illustrates an example vehicle system 100 as shown from a top view. Vehicle system 100 includes a vehicle body 101 with a front end, labeled "FRONT", and a back end labeled "BACK." Vehicle system 100 may include a plurality of wheels 130. For example, as shown in FIG. 1, vehicle system 100 may include a first pair of wheels adjacent to the front end of the vehicle and a second pair of wheels adjacent the back end of the vehicle. Forward motion of the vehicle should be understood to mean motion of the vehicle toward the front end of the vehicle and backward motion of the vehicle should be understood to mean motion of the vehicle toward the back end of the vehicle.

Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by line 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by line 122 where the motor may convert the kinetic energy of the vehicle to electrical energy for storage at energy storage device 150 as indicated by line 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by line 162.

During still other operating conditions, engine 110 may be operated by combusting fuel received from fuel system 140 as indicated by line 142. For example, engine 110 may be operated to propel the vehicle via drive wheel 130 as indicated by line 112 while motor 120 is deactivated. During other operating conditions, both engine 110 and motor 120 may each be operated to propel the vehicle via drive wheel 130 as indicated by lines 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by line 122. For example, during select operating conditions, engine 110 may drive generator 160, which may in turn supply electrical energy to one or more of motor 120 as indicated by line 114 or energy storage device 150 as indicated by line 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by line 142. Still other suitable fuels or fuel blends may be supplied to engine 110, where they may be combusted at the engine to produce an engine output. The engine output may be utilized to propel the vehicle as indicated by line 112 or to recharge energy storage device 150 via motor 120 or generator 160.

In some examples, as shown in FIG. 1, fuel tank 144 may be packaged in the vehicle adjacent to a wheel axle, e.g., adjacent to wheel axle 103 towards the back side of the vehicle. However, in other examples, fuel tank 144 may be positioned in another region of the vehicle, e.g., adjacent to a front axle or other location. Further, as described in more detail below, in some examples, fuel tank 144 may have a shelf tank design where a depth of a first region of the fuel tank, e.g., a rear region of the fuel tank, is less than a depth of a second region of the tank, e.g., a front region. Further, fuel tank 144 may include a plurality of components, such as support structures and one or more fuel pumps. For example, fuel tank 144 may be substantially composed of a plastic and may include reinforcement elements therein. Further, as described in detail below with regard to FIGS. 3-5, fuel tank 144 may include a wave catcher coupled to walls of the fuel tank to assist in dampening waves of liquid fuel within the tank during vehicle motion.

In some embodiment, the fuel tank may include an undulating vertical wall positioned oblique to longitudinal waves flowing in the tank from a shelf region of the fuel tank, the wall coupled to long and short vertical walls of the fuel tank, the undulations being wave-shaped. Further still, other shapes may be used, if desired.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3 and 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by line 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by line 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196.

This plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

It should be understood that though FIG. 1 shows a plug-in hybrid electric vehicle, in other examples, vehicle 100 may be a hybrid vehicle without plug-in components. Further, in other examples, vehicle 100 may not be a hybrid vehicle but may be another type of vehicle with other propulsion mechanisms, e.g., a vehicle with a gasoline engine or a diesel engine which may or may not include other propulsion systems.

FIG. 2 shows a side view of vehicle system 100. As described above with regard to FIG. 1, vehicle system 100 includes a vehicle body 101 with a front end, labeled "FRONT", and a back end labeled "BACK." Vehicle system 100 may include a plurality of wheels 130. For example, as shown in FIG. 2, vehicle system 100 may include a first pair of wheels adjacent to the front end of the vehicle and a second pair of wheels adjacent the back end of the vehicle.

FIG. 2 shows fuel tank 144 packaged in vehicle 100 from a side view. In the example shown in FIG. 2, fuel tank 144 is positioned adjacent to a rear axle 103 of the vehicle. However, in other examples, fuel tank 144 may be positioned adjacent to other components of the vehicle system.

Fuel tank has a front side 202 facing towards the front end of the vehicle and a back side 204 facing towards the back end of the vehicle. Further, as remarked above, in some examples, fuel tank 144 may have a shelf tank design so that a depth of a first region 206 of fuel tank 144 adjacent to front side 202 is greater than a depth of a second region 208 of fuel tank 144 adjacent to back side 204. As described above, this shelf tank shape may assist in packaging of the fuel tank in a vehicle. As remarked above, during accelerations or deceleration of vehicle 100 in the forward or backward direction, waves of liquid fuel may be formed and may combine to create a large energy force hitting one or more walls of the fuel tank, e.g., one of the front corners of the fuel tank. This wave may create a slap noise or sloshing sound that is audible to a vehicle operator from inside of the vehicle, particularly when the engine of the vehicle is not in operation (e.g., during electric motor operation in a hybrid vehicle). Thus, as described in more detail below with regard to FIGS. 3-5, fuel tank 144 may include a wave catcher 210 coupled to interior walls of the fuel tank adjacent to the front end 202 of fuel tank 144.

FIGS. 3-5 show various viewpoints of a fuel tank 144 with a shelf tank design and including a wave catcher 210 at a front end 202 of the fuel tank. In particular FIG. 3 shows a side view of example fuel tank 144, FIG. 4 shows a top view of example fuel tank 144, and FIG. 5 shows a perspective view of example fuel tank 144. FIGS. 3-5 are drawn approximately to scale, although other relative dimensions may be used, if desired. It should be understood that though FIGS. 3-5 show a fuel tank with a shelf shaped design, in other examples, fuel tank 144 may have any suitable shape, e.g., a box shape, circular shape, or some other combination of shapes, etc. Fuel tank 144 may be substantially composed of a plastic material and may include various components, such as support structures, fuel pumps, etc., in addition to a wave catcher. Further, it should be understood that though FIGS. 3-5 shows a wave catcher 210 positioned adjacent to front end 202 of fuel tank 144, in other examples, wave catcher 210 may be positioned adjacent to back end 204 or at any other suitable position within fuel tank 144.

As described above, with reference to FIG. 3, fuel tank 144 may have a shelf tank design where a depth 304 of fuel tank 144 in a second region 208 of the fuel tank is less than a depth 306 of fuel tank 144 in a first region 206 of fuel tank 144. In some examples, there may be a transition region, indicated at 302 in FIG. 3, which transitions from the first, deeper, region 206 of the fuel tank to the second, shallower, region 208 of the fuel tank. For example, in transition region 302, a depth 308 of the fuel tank may decrease in a direction from first region 206 towards second region 208.

In some examples, as shown in FIGS. 3-5, the first, deeper, region of the fuel tank may be positioned in a vehicle, such as vehicle 100, facing towards the front end of the vehicle whereas the second, shallower region of the fuel tank may be positioned adjacent to the back end of the vehicle. However, in other examples, the first region 206 may be positioned towards the back of the vehicle and the second region 208 may be positioned towards the front.

Wave catcher 210 is coupled to interior walls 314 of the fuel tank adjacent to the front end 202 of the fuel tank. As described in more detail below, the wave catcher may extend through an interior 330 of the fuel tank and may be coupled to a front wall 381 at front end 202 and a first side wall 383 at a first side 392 of the fuel tank.

The top 340 of the wave catcher 210 may not extend all the way to the top 385 of the fuel tank, instead a first gap or space with a non-zero distance 310 may be formed between the top 340 of the wave catcher 210 and an interior wall of the fuel tank at the top 385 of the fuel tank. Likewise, the bottom 342 of the wave catcher 210 may not extend all the way to the bottom 387 of the fuel tank, instead a second gap or space with a non-zero distance 312 may be formed between the bottom 342 of the wave catcher 210 and an interior wall of the fuel tank at the bottom 387 of the fuel tank. In this way, fuel may be permitted to flow above and below the wave catcher into a region 318 of the fuel tank partially isolated by the wave catcher. In some examples, the first and second gaps may extend along an entire length of the wave catcher.

As shown in FIG. 4, one end of wave catcher 210 is coupled to an interior wall 314 of the first side wall 383 at side 392 of the fuel tank. The other, opposing end of wave catcher 210 is coupled to an interior wall 314 of front wall 381 at front end 202. For example, as shown in FIG. 4 the front wall 381 may be substantially perpendicular to the first side wall 383. The wave catcher may be coupled to front wall 381 at a position adjacent to a corner 316 of the fuel tank formed by the front wall 381 and a second side wall 389 at a side 394 of the fuel tank opposing first side 392. In this way, wave catcher 210 partially partitions the interior space of the fuel tank into a region 318 between the wave catcher and front end 202 and a region 330 between the wave catcher and the back end 204 of the fuel tank. However, as shown in FIG. 3, spaces are included in the interior of the fuel tank above and below wave catcher 210 so that fuel may flow between region 318 and region 330.

As shown in FIGS. 4 and 5, walls 328 of wave catcher 210 may have a curved shape, e.g., consisting of a plurality or arc shapes, in order to deflect waves from the corners 316 or 320 at front side 202 of fuel tank 144. Further, in some examples, the corners of the fuel tank may be rounded in order to assist in reducing energy of any waves of liquid fuel that come in contact with the corners of the fuel tank. Further, wave catcher 210 may include a first concave portion 322, followed by a convex portion 324, followed by a second concave portion 326 in a direction along the wave catcher from the front wall 381 towards the first side wall 383. However, in other examples, wave catcher may only include a concave portion 322 and a convex portion 324, or other combinations of concave and convex regions.

A length 360 in region 318 between a wall 364 facing front end 202 and the front wall 381 may increase throughout the length of the wave catcher in a direction from front wall 381 towards side wall 383. In this way, waves of liquid fuel approaching wave catcher 210 from back end 204 may be at least partially dispersed in order to reduce wave energy and noise pollution caused by the waves in the tank.

Further, a length 332 between corner 320 of fuel tank 144 and first wall 383 at the wave catcher may be less than a length 334 between corner 320 and front wall 381 at the wave catcher. For example, a distance between a corner formed at an intersection of the first side wall and the front wall at the wave catcher is less than a distance between the corner and the first wall at the wave catcher. In some examples, length 334 may be less than a width 336 of the fuel tank. However, in other examples, length 334 may be substantially the same as the width 336 of the fuel tank so that wave catcher 210 is coupled to an interior wall of the fuel tank at corner 316. Note that FIGS. 3-5 are drawn to scale, although other relative dimensions may be used, if desired.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel tank for a vehicle comprising:
   an undulating wave catcher formed as a vertically-positioned wall comprising a plurality of arc shapes extending through an interior of the fuel tank, and having a first end coupled to a front wall and a second end coupled to a first side wall of the fuel tank prior to the fuel tank narrowing to a shelf region;
   a first space above a top of the vertically-positioned wall and an inner surface of a top of the fuel tank; and
   a second space below a bottom of the vertically-positioned wall and an inner surface of a bottom of the fuel tank.

2. The fuel tank of claim 1, wherein the wave catcher is solid and does not include any holes.

3. The fuel tank of claim 1, wherein the front wall is substantially perpendicular to the first side wall and a length between the wave catcher and the front wall increases throughout the length of the wave catcher and prior to narrowing of the fuel tank to the shelf region.

4. The fuel tank of claim 1, wherein the fuel tank includes a first region with a first depth and a second region with a second depth less than the first depth, and wherein the front wall is adjacent to the first region.

5. The fuel tank of claim 4, wherein the second region is adjacent to a back wall of the fuel tank opposing the front wall of the fuel tank.

6. The fuel tank of claim 1, wherein the plurality of arc shapes includes a concave portion, followed by a convex portion, followed by another concave portion in a direction from the front wall to the first side wall.

7. The fuel tank of claim 1, wherein the wave catcher is coupled to the front wall adjacent to a corner of the fuel tank formed by the front wall and a second side wall of the fuel tank opposing the first side wall.

8. The fuel tank of claim 1, wherein the vehicle is a hybrid vehicle.

9. A fuel tank for a hybrid electric vehicle comprising:
   an internal wavecatcher in the form of an undulating vertical wall positioned in a deeper region of the fuel tank and oblique to longitudinal waves flowing in the tank from a shelf region of the tank, first and second opposing ends of the wall coupled to long and short vertical walls of the fuel tank respectively, prior to narrowing of the fuel tank to a shallower region, the undulations being wave-shaped, the deeper region toward a front of the vehicle;
   a first space above a top of the undulating vertical wall and a top of the fuel tank; and
   a second space below a bottom of the undulating vertical wall and a bottom of the fuel tank.

10. The fuel tank of claim 9, wherein the undulating vertical wall is coupled to a first side wall of the fuel tank and a front wall of the fuel tank adjacent a corner of the fuel tank formed by the front wall and a second side wall opposing the first side wall.

11. The fuel tank of claim 10, wherein the front wall is substantially perpendicular to the first side wall and a distance between a corner formed at an intersection of the first side wall and the front wall at the undulating vertical wall is less than a distance between the corner and the first side wall at the vertical wall.

12. The fuel tank of claim 9, wherein the fuel tank includes a first region with a first depth and a second region with a second depth less than the first depth, and a transition region between the first region and the second region, and wherein a front wall is adjacent to the second region, and wherein a depth of the fuel tank in the transition region increases in a direction from the second region to the first region.

13. The fuel tank of claim 12, wherein the second region is adjacent to a back wall of the fuel tank opposing the front wall of the fuel tank.

14. The fuel tank of claim 9, wherein the undulating vertical wall includes a concave portion, followed by a convex portion in a direction from a front wall to a first side wall, the vertical wall being rectangular when viewed from a side of the vehicle.

15. The fuel tank of claim 9, wherein the undulating vertical wall is coupled to a front wall adjacent to a corner of the fuel tank formed by the front wall and a second side wall of the fuel tank opposing a first side wall.

16. A fuel tank for a hybrid electric vehicle comprising:
a wave catcher formed as a vertically-positioned wall having a first end coupled to a first side wall of the fuel tank prior to a narrowing of the fuel tank to a shelf region, and a second end coupled to a front wall of the fuel tank adjacent a corner of the fuel tank formed by the front wall and a second side wall opposing the first side wall and where a length between the wave catcher and the front wall increases throughout the length of the wave catcher and the front wall; and
a first space between a top of the vertically-positioned wall and an interior wall of a top of the fuel tank and a second space between a bottom of the vertically-positioned wall and an interior wall of a bottom of the fuel tank.

17. The fuel tank of claim 16, wherein the first and second spaces extend along entire lengths of the respective top and bottom of the wave catcher wall.

18. The fuel tank of claim 16, wherein the fuel tank includes a first region with a first depth and a second region with a second depth less than the first depth, the second region including the shelf region, and a transition region between the first region and the second region, and wherein the front wall is adjacent to the first region, and wherein a depth of the fuel tank in the transition region increases in a direction from the second region to the first region, the vertically-positioned wall positioned in the first region.

19. The fuel tank of claim 16, wherein the wave catcher includes a concave portion, followed by a convex portion in a direction from the front wall to the first side wall.

* * * * *